(12) United States Patent
Whitlow et al.

(10) Patent No.: US 7,454,313 B2
(45) Date of Patent: Nov. 18, 2008

(54) HIERARCHICAL WORKLOAD MONITORING FOR OPTIMAL SUBORDINATE TASKING

(75) Inventors: Stephen D. Whitlow, Saint Louis Park, MN (US); Santosh Mathan, Minneapolis, MN (US); Michael C. Dorneich, St. Paul, MN (US); Patricia M. Ververs, Ellicott City, MD (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/442,894

(22) Filed: May 30, 2006

(65) Prior Publication Data

US 2007/0282566 A1    Dec. 6, 2007

(51) Int. Cl.
*H04M 1/64* (2006.01)
(52) U.S. Cl. .................. 702/182; 702/97; 702/127; 702/141; 702/142; 702/150; 702/153; 482/1; 482/2; 482/3; 482/4; 482/5; 482/6; 482/7; 482/8; 482/9; 482/900; 482/901; 482/902; 701/207; 701/213; 701/214; 701/215; 701/216; 379/88.22
(58) Field of Classification Search .................. 702/182, 702/97, 127, 141–142, 150, 153; 482/1–9, 482/900–902; 701/207, 213–216
See application file for complete search history.

(56) References Cited

U.S. PATENT DOCUMENTS

| | | | |
|---|---|---|---|
| 5,832,187 A | 11/1998 | Pedersen et al. | |
| 6,249,755 B1 | 6/2001 | Yemini et al. | |
| 6,434,512 B1 | 8/2002 | Discenzo | |
| 6,736,759 B1 * | 5/2004 | Stubbs et al. | 482/8 |
| 2002/0060630 A1 | 5/2002 | Power | |
| 2005/0071190 A1 | 3/2005 | Herger et al. | |
| 2006/0029198 A1 * | 2/2006 | Dorneich et al. | 379/88.22 |

FOREIGN PATENT DOCUMENTS

WO    2004090764    10/2004

OTHER PUBLICATIONS

Fair, Douglas C. "Chapter 5: Statistical Process Control Approaches: Basic Theory and Use of Control Charts," pp. 127-172.*

(Continued)

*Primary Examiner*—Tung S Lau
*Assistant Examiner*—Sujoy K Kundu
(74) *Attorney, Agent, or Firm*—Ingrassia, Fisher & Lorenz, P.C.

(57) ABSTRACT

A system and method of hierarchical monitoring for subordinate assessment is described. Generally, the system receives remotely sensed data about a user's physiology and contextual state, and extracts features that are related to the workload currently being experienced by a single subordinate and/or group of subordinates. The system builds workload indices based on levels of these features. The system uses statistical process control techniques in conjunction with the workload indices to identify suboptimal user states. Information regarding a particular subordinate or the group of subordinates may be presented in a variety of different ways. As a result, a superior can easily determine the condition of the one or more subordinates and make task adjustments to influence workload levels.

18 Claims, 4 Drawing Sheets

OTHER PUBLICATIONS

The Augcog Quarterly, vol. 1, No. 3, Jan. 2004, Pag 13.*
http://www.meriam-webster.com/dictionary/cognitive.*
Mathan et al., "Sensor-Based Cognitive State Assessment in a Mobile Environment," Proceedings of the 1st International Conference on Augmented Congition, Las Vegas, NV, Jul. 22-27, 2005.
Tynkkynen, Mika., "Assessing Harvester Operators' Mental Workload Using Continuous ECG Recording Technique," International Journal of Cogitive Ergonomics, 2001, 5(3), 213-219, 2001, Lawrence Eribaum Associates, Inc.
Wilson et al., "Performance Enhancement with Real-Time Physiologically Controlled Adaptive Aiding," Proceedings of the IEA 2000/ HFES 2000 Congress.
European Application No. 07108930.4—European Search Report mailed Oct. 18, 2007.

* cited by examiner

HIERARCHICAL WORKLOAD MONITORING FOR OPTIMAL SUBORDINATE TASKING

FIELD

The present invention relates generally to monitoring the functional cognitive capacity of subordinates, and more particularly, relates to hierarchical workload monitoring for optimal subordinate tasking.

BACKGROUND

Traditionally, superiors assess the functional cognitive capacity of their subordinates based on direct observations, direct queries, radio communications, and/or historical performance. This practice may be sufficient some of the time, but not always. As a result, one or more of the superior's subordinates may become overworked or overstressed, or conversely underworked and underutilized, which may lead to inefficiencies and injuries.

There is a trend in military and civilian operations towards distributed teams connected via voice communications. The distributed nature of the teams impedes direct, visual observation and denies the broad range of visual behavioral cues that team members can use to assess an individual's workload. Even when visual contact can be made, the culture of many task environments may prevent subordinates from revealing vulnerabilities. The subordinate may maintain an appearance of composure and competence even when they may be overcome by the stress and workload of a given situation. Furthermore, moment-to-moment variability in fatigue, stress levels, vigilance, and cognitive capacity may compromise workload predictions based on past history. Additionally, it may not be possible to use past history to predict an individual's response to task demands when task environments change.

In dynamic and enduring operations, such as those of the battle field and first responder incidents, an individual's workload may undergo rapid and/or extreme changes within very small windows of time. Alternatively, the individual's workload may trend slowly over time to precariously low or high workload levels. Without adequate and direct monitoring of each subordinate's workload capacity, some subordinates may be tasked with more task demands than they can effectively handle, while other personnel may go underutilized to the point of boredom, which could compromise their responsiveness to subsequent task responsibilities.

Thus, it would be beneficial to provide a real-time workload assessment of subordinates to a superior, which may be used to adjust subordinate task assignments and thereby workload levels.

SUMMARY

A method and system of hierarchical monitoring for subordinate assessment is described. A method for analyzing subordinate workload includes receiving data from at least one sensor that detects at least one characteristic of an individual, selecting data that is relevant to a workload level of the individual, normalizing the selected data, and presenting the normalized data in a manner that allows the workload level of the individual to be monitored. The sensor may be located on the individual's body, clothing, or gear, or near the individual (e.g., an eyetracker that measures pupilometry and/or visual scanning behavior may be located off the body), to directly monitor state information.

At least one sensor detects physiological and/or contextual characteristics of the individual. For example, the sensor may be an electroencephalogram (EEG) sensor, an electrocardiogram (ECG) sensor, an electro-oculogram (EOG) sensor, an impedance pneumogram (ZPG) sensor, a galvanic skin response (GSR) sensor, a blood volume pulse (BVP) sensor, pupilometry sensor, visual scanning sensor, a blood oxygenation sensor, a respiration sensor, an electromyogram (EMG), a blood pressure sensor, a skin and core body temperature sensor, a near-infrared optical brain imaging sensor, an accelerometer, a global positioning system (GPS), and/or a gyroscope.

Selecting the data may include identifying what data are relevant to the workload level prior to receiving the data. In one example, presenting the normalized data includes presenting the normalized data in relationship to a historical data distribution. The normalized data may be presented as a z-score that is normalized to the historical data distribution. In another example, the normalized data are presented on a coincident factor display. In yet another example, the normalized data are presented as a normalized historical trend on a strip chart.

The method may also include adjusting the workload level of the individual if the workload level is not within a predetermined range.

In one example, a system for analyzing subordinate workload includes a processor, data storage, and machine language instructions stored in the data storage executable by the processor to: (1) receive data from at least one sensor that detects at least one characteristic of an individual; (2) extract features from the data that are relevant to a workload level of the individual; (3) build workload indices based on the extracted features; (4) compare the workload indices to expected workload levels; and (5) identify whether the workload level is within a predetermined range. Additionally, the system may estimate whether the workload level is trending towards an undesirable range or a desirable range.

Extracting features that are relevant to the workload level may include selecting what data to use to build the workload indices. Building the workload indices may include normalizing the extracted features. The machine language instructions stored in the data storage executable by the processor may also be able to display the workload level.

In another example, a system for analyzing subordinate workload includes a data logging means operable to receive, store, and index data; a distribution means operable to select data from the indexed data relevant to a workload level of an individual and normalize the selected data; a statistical process control means operable to calculate a mean and standard deviation associated with the normalized data; and a display means operable to present the normalized data in a context to evaluate the workload level of the individual. The display means may present the normalized data in relationship to a historical data distribution, on a coincident factor display, and/or in a normalized history view.

As a result, a superior can easily determine the condition of the one or more subordinates and make task adjustments to improve workload levels. These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
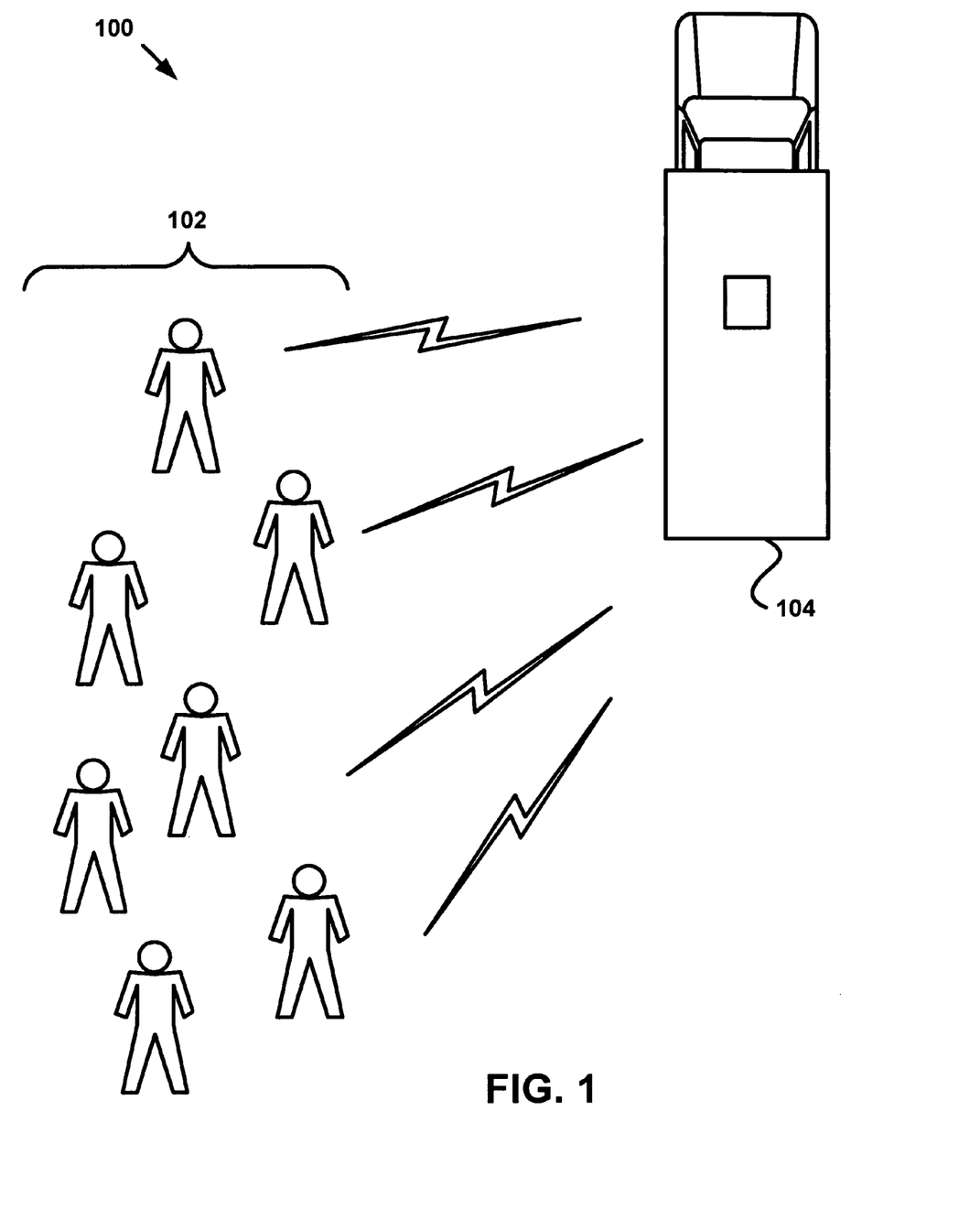
FIG. 1 is a pictorial representation of monitoring a group of subordinates, according to an example.

FIG. 1 is a pictorial representation 100 of monitoring a group of subordinates 102. The group of subordinates 102 may be one or more people (adults and/or children) whose workload will be monitored. The group of subordinates 102 may be assigned a task to perform, which may be either a civilian or a military task. For example, the group of subordinates 102 may be a group of firemen assigned to fight a forest fire. As another example, the group of subordinates 102 may be an Army unit assigned to a long-range reconnaissance or building clearing mission.

Each of the subordinates may have one or more devices located on their bodies, clothing and/or gear (e.g., helmet, gun) that transmits physiological data, contextual data, and/or any other relevant data, such as ambient temperature, to a processing unit. Alternatively, each of the subordinates may have one or more devices located nearby, such as on a desk or a vehicle dash.

For example, the device may be an electroencephalogram (EEG) sensor, an electrocardiogram (ECG) sensor, an electro-oculogram (EOG) sensor, an impedance pneumogram (ZPG) sensor, a galvanic skin response (GSR) sensor, a blood volume pulse (BVP) sensor, a respiration sensor, an electromyogram (EMG) sensor, a pupilometry sensor, a visual scanning sensor, a blood oxygenation sensor, a blood pressure sensor, a skin and core body temperature sensor, a near-infrared optical brain imaging sensor, or any other device that can sense physiological changes in a subordinate. Additionally, the device may be an accelerometer, a global positioning system (GPS), a gyroscope, eyetracker, acoustic sensor, or any other device that can sense position, location, rate of movement, activity, or other contextual data. The devices may be commercial off-the-shelf devices or custom designed.

In one example, multiple sensors may be located on a subordinate. For example, an EEG sensor may be located on the subordinate's head, an ECG sensor may be located on the subordinate's chest, and a GPS device may be located in the subordinate's clothing or helmet. Alternatively, a single sensor or a single device that can sense multiple conditions may be located on a subordinate. For example, an EEG sensor, an accelerometer, and a gyroscope may be co-located within a device that is attached to the subordinate's head. In this example, the device may provide the roll-pitch-yaw position of the subordinate's head in addition to providing brain wave activity.

The devices located on the subordinate may wirelessly transmit data to a processing unit. The processing unit may include a display for presenting information regarding the subordinate or the group of subordinates 102. Alternatively, the processing unit may transmit data via a wired or wireless connection to a display that can be monitored by a superior. The superior may be any person monitoring the group of subordinates 102 including, but not limited to, a leader (e.g., captain, commander, supervisor, manager) of the group of subordinates 102.

The processing unit may be a commercial off-the-shelf computing device or a custom designed computing device. The processing unit may be located in a convenient location to monitor the subordinates 102. In FIG. 1, the processing unit is located in a truck 104, but the processing unit may be located on a body, or in any type of vehicle or building that is located in range to receive the information from the subordinates 102. For example, the processing unit could be located within a mounted military vehicle, robotic support vehicle, first responder mobile command vehicle, or within a body worn processor. The body worn processor may be located on a person's body and/or clothing. The person may be the superior, the subordinate, or any other appropriate person for receiving the information.

For each monitored subordinate, the processing unit may log sensor data over long time periods. For example, the data could be logged over temporal windows spanning days, months, and/or years. Generally, statistical models based on large samples are more representative of the phenomenon of interest and permit more accurate inferences about cognitive state.

Figure 2:
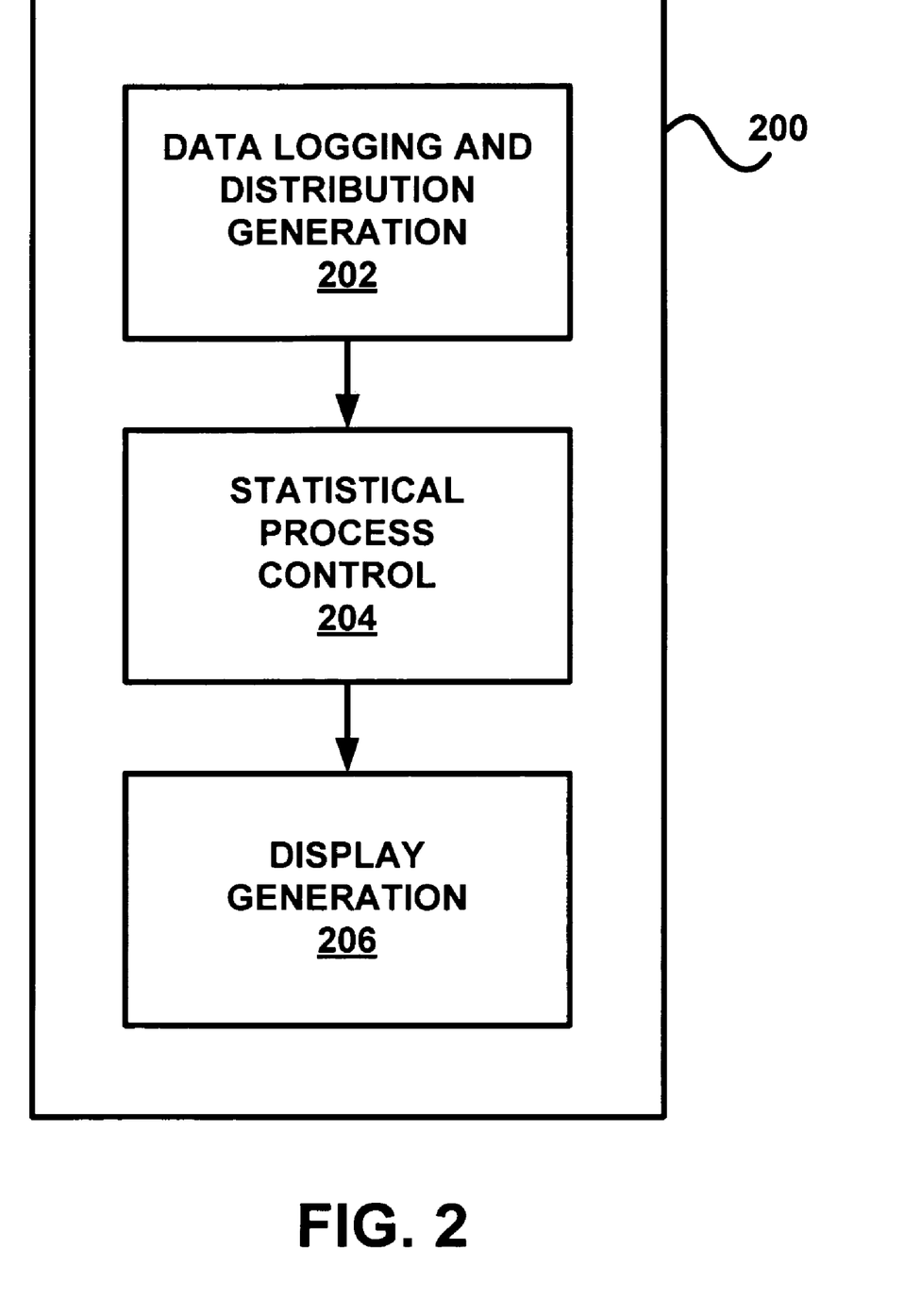
FIG. 2 is a block diagram of a system for analyzing the workload of the group of subordinates depicted in FIG. 1, according to an example.

FIG. 2 is a block diagram of a system 200 for analyzing the workload of the group of subordinates 102 depicted in FIG. 1. The system 200 is substantially the same as the processing unit described with reference to FIG. 1. Generally, the system 200 receives remotely sensed data about a user's physiology and contextual state, and extracts features that are related to the workload currently being performed by the subordinates 102. The system 200 then builds workload indices based on levels of these features. The system 200 uses statistical process control techniques in conjunction with the workload indices to identify suboptimal user states. Information regarding a particular subordinate or the group of subordinates 102 may be presented to the superior in a variety of different ways, such as visually, auditorily, or tactilely. As a result, the superior can easily determine the condition of one or more subordinates in the group of subordinates 102 and make task adjustments to influence workload levels.

The system 200 may be any combination of hardware, software, and/or firmware that performs the following functions: (1) subordinate data logging and distribution generation 202; (2) statistical process control 204; and (3) display generation 206. Preferably, the system 200 is a commercial off-the-shelf computer unit that has been programmed to perform the functions 202-206. Alternatively, the system 200 is a custom designed computing device. The system 200 may also include additional features, such as an output device for presenting the results, memory for storing data and executable programs, and a user interface for allowing a user to control the operation of the system 200.

The system 200 may be located in a convenient location to monitor the subordinates 102. For example, the system 200 may be located within a mounted military vehicle, robotic support vehicle, first responder mobile command vehicle, or within a body worn processor. The location of the system 200 may depend on bandwidth and transmission range considerations, the activity being performed by the group of subordinates 102, and the location of the group of subordinates 102. Other factors may also be considered when determining where to locate the system 200.

The data logging and distribution generation function 202 receives data transmitted from one or more devices located on at least one subordinate, logs the data received, and builds workload indices based on sensor features that permit inferences about workload. The system 200 may receive a wide variety of data from a wide variety of sensors. Several non-limiting data-type examples are described as follows.

An EEG sensor may be used to monitor a subordinate's brain wave activity by sensing electrical potential at the scalp. Measurements by the EEG sensor are categorized into frequency bands, including delta, theta, alpha, and beta. For example, the delta band ranging from 1-4Hz indicates a state of unconsciousness, the theta band ranging from 4-8Hz indicates a state of daydreaming, the alpha band ranging from 8-13Hz indicates an alert, but not mentally busy state, and the beta band ranging from 13-30 Hz indicates a state of higher thought process. Other frequency bands are possible. Based on the EEG sensor location and the dominant frequencies detected, EEG data may help evaluate the type and amount of mental activity of the subordinate. For example, if there are significant brain waves measured in the frontal brain, the subordinate may be actively manipulating information within his or her working memory. As a result, the EEG sensor may be used to measure the cognitive state of a subordinate.

Other physiological sensors that may be used include: an ECG sensor, which measures heart rate by detecting electrical activity of the heart muscle; an EOG sensor, which measures eye movement by detecting electrical changes between the front and back of the eye as the eye moves; a ZPG sensor or other type of respiration sensor, which measures lung capacity and can be used to determine whether the subordinate is having difficulty breathing; a GSR sensor, which measures changes in conductivity of the skin caused by sweating and saturation of skin ducts prior to sweating; a pupilometry sensor, which measures the pupil dilation to determine level of engagement or interest in a task, or cognitive load of a task; a visual scanning sensor, which measures scanning behavior and dwell time to provide insight into visual attention; a blood oxygenation sensor, a BVP sensor, which measures heart rate by detecting changes in blood volume at a given location of the body; an EMG sensor, which measures currents associated with muscle action; a blood pressure sensor; a skin and core body temperature sensor; and a near-infrared optical brain imaging sensor, which measures brain function.

An accelerometer measures the rate at which an object is moving, GPS measures the location of an object, an acoustic sensor measures the loudness and frequency of ambient sounds, an eyetracker measures pupilometry and/or visual scanning behavior, and a gyroscope measures angular rate. Data from these sensors may be used to identify the position, location, and/or rate and direction of movement of an object. Data from these contextual sensors may be used to determine whether the subordinate is stationary or moving.

If the subordinate is stationary, these sensors may be used to determine whether the subordinate is standing, leaning, or prone. If the subordinate is moving, these sensors may be used to determine the rate, direction, and/or acceleration of the movement. Data from an accelerometer located on a helmet or protective hat may be used to measure head movement such as yaw, pitch, and roll. Additionally, data from an eye tracker may be used to infer cognitive state from pupil dilation response and to infer visual attention indices from dwell time and scanning patterns.

The sensors output an electrical signal that represents the measured stimulus. The electrical signal can be transmitted wirelessly to the system 200. The electrical signal may be modified prior to transmission to format the signal as needed. Signal processing techniques and wireless transmission of signals are well-known in the art.

The data received by the system 200 may be stored in a database. The database may be part of the system 200 or located elsewhere, but available to the system 200. The data is logged by the data logging and distribution generation function 202. The data may be indexed by individual subordinate and/or by the group of subordinates 102. Other indexes may also be used, such as the type of data, and the date and/or the time the data were received by the system 200.

Not all of the data received by the system 200 may be relevant to the workload of the subordinate. The features relevant to workload may be extracted by the data logging and distribution generation function 202. For example, it may be determined that the EEG data from a specific scalp location and in a particular frequency range provides the most information regarding workload. Data having the relevant characteristics are extracted and used to identify suboptimal user states.

The selection of what data to extract may be defined at one time or may be selectable by the user. For example, the system 200 may be programmed to always extract the same features. For example, a fire department may have standardized equipment that firefighters wear and use. Additionally, the firefighters may be monitored in a limited range of activities, typically those involved with extinguishing fires. Thus, the system 200 may be pre-programmed to extract the workload features that are most relevant to fire fighting activities.

As another example, the system 200 may be designed so that the superior or other person can modify what features to extract based on the activity being performed by the subordinates. This may be especially useful for a group of subordinates 102 that perform many different tasks in a variety of environments. The system 200 may provide a user interface that allows the superior or other appropriate person to select which features to extract for a particular activity. Alternatively, the system 200 may select which features to extract based on user input, such as type of activity, location of activity, and what sensors are available for transmitting data to the system 200.

Once the features related to workload are extracted, the data logging and distribution generation function 202 builds workload indices based on the extracted features. The workload indices may be normalized data. For example, if the frontal theta levels from an EEG sensor have been extracted for a subordinate, the frontal theta levels may be normalized so that this data can be compared with expected data. The expected data may be historical data from previous workload situations.

The statistical process control function 204 may use statistical process control techniques. For example, the mean and standard deviation associated with the workload indices derived from features identified by the data logging and distribution generation function 202 may be used to compare the normalize workload values with expected values. Extreme deviations from nominal values may provide indications of a suboptimal user state.

By using statistical process control techniques, in conjunction with samples gathered over long time windows, more accurate inferences about cognitive state can be made. For every individual, each new value of a workload sensitive measure could be normalized with respect to the mean and standard deviation of that measure, in other words, transformed into a z-score. The z-score for an item indicates how far and in what direction the item deviates from its distribution's mean.

Higher, absolute z-score values correspond to atypical workload states that superiors may consider in their task allocation related decision making. Both the mean and standard deviation may be computed continuously so that every value of a measure could be compared against stable, historical properties of that measure. Over time, this approach supports self-normalization since state values are presented as normalized scores for a given entity.

The display generation function 206 may provide the superior with one or more displays that provide information regarding the group of subordinates 102. For example, data may be presented on instantaneous state display (ISD), with other contextual data to give a more reliable and accurate assessment of the state of the subordinate presented on a coincident factor display (CFD). Trend data, enabled by a moving-window median filter, may be presented within a state/trend categorization nomenclature and/or normalized history view (NHV). The data can be viewed at the individual or group level. Example screen shots of each of these display formats are provided in FIG. 3. However, other display formats may also be used.

Figure 3:
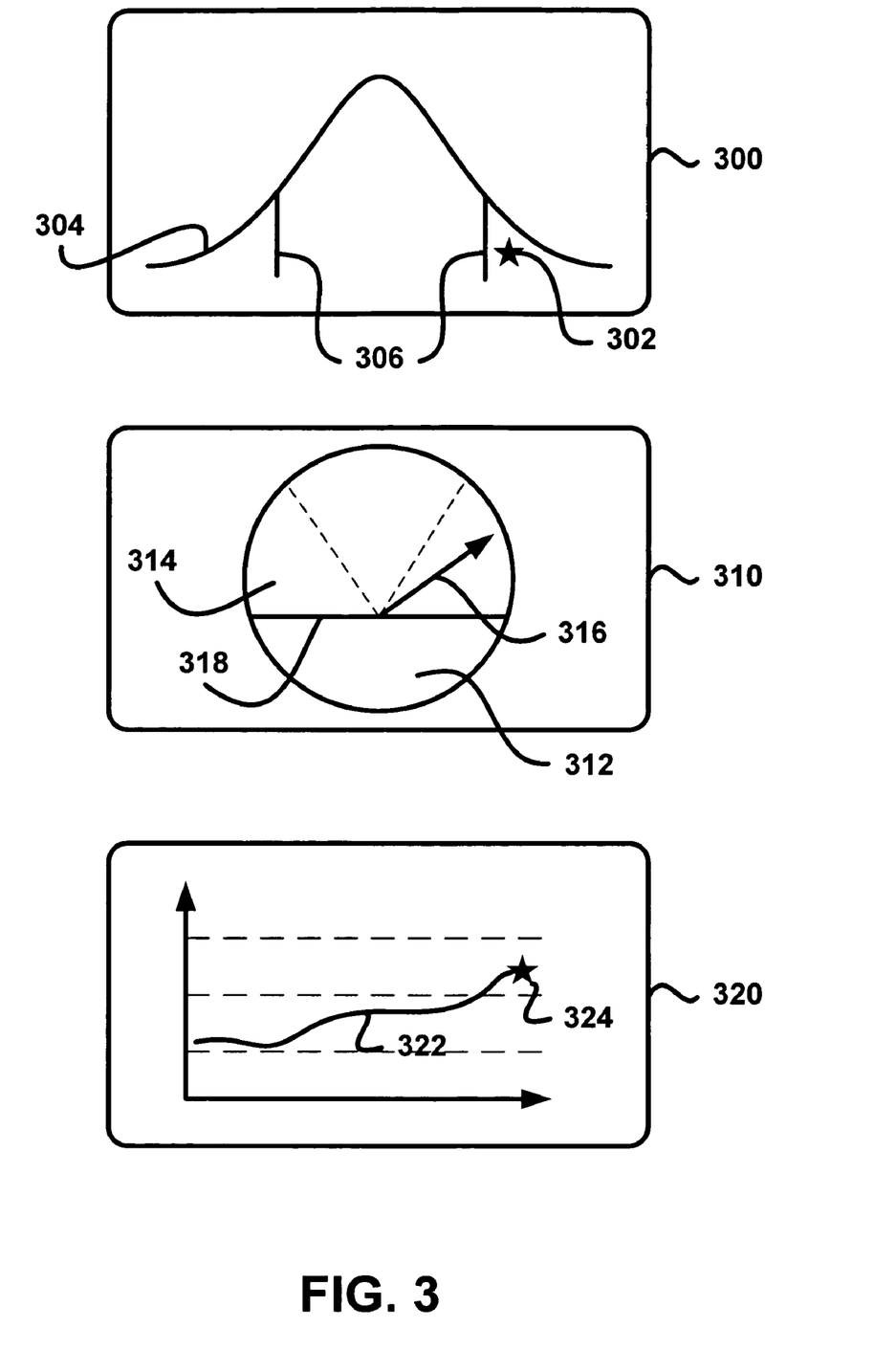
FIG. 3 depicts sample screen shots that may be used by superiors to optimize the workload of the group of subordinates depicted in FIG. 1, according to an example.

FIG. 3 depicts three example screen shots 300, 310, 320. The screen shots 300, 310, 320 may be presented on a display that is part of or connected to the system 200. The display may be similar to the displays found on PDAs, cellular telephones, and laptop computers. Alternatively, the display may be a monitor similar to the monitors used with personal computers.

A single display may be used to present the different display formats. In this example, the different display formats may be presented on the display at the same or different times. If the display formats are presented at different times, the superior may determine which format to use and when. Alternatively, the system 200 may determine which display format to use based on a variety of factors, such as the type of activity, the location of the activity, and what sensors are available for transmitting data to the system 200. The system 200 may also alternate which display format is presented based on a predetermined time schedule, such as changing the display format every minute. In another example, the system 200 may present the data on multiple displays so the supervisor can view the different display formats at substantially the same time.

The ISD screen shot 300 depicts the current state information 302 for a subordinate in terms of how the state relates to the historical data distribution 304. While the current state information 302 is depicted as a "star" other appropriate symbols may be used. For example, when current state information for multiple subordinates is depicted, the system 200 may use the subordinates' initials to distinguish between the different individuals. Lines 306 are used to show a z-score value equal to −1(left) and +1(right). Additional lines may used to show additional z-scores.

Using the screen shot 300, the superior can easily identify that the subordinate is currently in a state that has a z-score value greater than +1. The supervisor or another appropriate person may have predetermined what absolute z-score value indicates a suboptimal user state threshold. For example, in one situation a z-score value greater than +1 may indicate that the subordinate's workload level is too high. However, in other activities a different absolute z-score value, such as 2, may be used as the suboptimal user state threshold.

This display format enables an efficient interpretation of how the current value 302 relates to the data distribution of the subordinate of interest. A moving-window median filter may be applied to recent values so that the moment-to-moment values represent the dominant recent state. As a result, the superior may not be confused by frequent oscillations.

The CFD screen shot 310 depicts configurable contextual information. Knowledge of the activity state (stationary, walking, or running) or body position (upright or prone) may be useful in assessing workload. The arrow 316 provides a quick and easy reference to identify the movement of the subordinate. When the arrow 316 is located below a line 318, in a region 312, the subordinate may be stationary and/or prone. The arrow 316 may be located above the line 318, in a region 314, indicating that the subordinate is moving. The rate of movement may be indicated by where the arrow 316 is pointing in the region 314. The further right the arrow 316 is pointing in the region 314, the faster the subordinate is moving. The arrow 316 may move in the region 314 as the subordinate's speed increases or decreases.

This display format may be used to evaluate other types of information as well. For example, the display format shown in screen shot 310 may be used to identify a subordinate's level of capacity to process new information. When the arrow 316 points to the left section of region 314 the subordinate may have plenty of capacity to process new information. When the arrow 316 points to the center section of region 314 the subordinate may be at capacity. When the arrow 316 points to the right section of region 314 the subordinate may be overloaded and not be able to process new information.

While the region 314 has been divided into three sections as depicted in screen shot 310, the region 314 may be divided in greater or less than three sections. Additionally, color may be used to further accentuate the subordinate state. For example, green may be used in the left section, yellow may be used in the center section, and red may be used in the right section of the region 314.

The NHV screen shot 320 depicts a strip chart that reflects the recent historical levels of the normalized values to provide insight into data trends. The NHV display provides historical trend recognition by applying a low pass filter, such as a moving average or median filter to emphasize long-term trends. A line 322 depicts the historical levels. The current level 324 may be located at the end of the line 322. While the current level 324 is depicted as a "star" other appropriate symbols may be used.

While screen shots 300, 310, 320 depict data for a single subordinate, the display may present data for the group of subordinates 102. The same probabilistic reasoning and statistical application may apply to either a single subordinate or the group of subordinates 102. A difference may be how the baseline distribution is generated.

For the group of subordinates 102, the workload index values may be averaged across individual subordinates. Mean and standard deviations derived from averaged data may be used to normalize new data. During real-time use, workload estimates of the group of subordinates 102 may be derived by averaging data values across individuals and normalizing these values by the mean and standard deviation computed previously.

Additionally or alternatively, a least common dominator may be used. For example, if any subordinate is in the "red" section, then the group of subordinates 102 is classified as red. As another example, if more than two subordinates are in the "red" section, then the group of subordinates 102 is classified as red. The rule for classifying the group of subordinates 102 can change or may be selectable by the superior.

Depending on the capabilities of the superior's display device, the display may use a categorical scheme to communicate the current level (e.g., high or low) as well as the current trend (trending higher, trending lower, or flat-no trend). For example, this information could be reflected as follows:

TABLE 1

|  | Trending: Higher | Trending: Lower | Trending: Flat |
| --- | --- | --- | --- |
| Current Level: Low | LH | LL | L-- |
| Current Level: High | HH | HL | H-- |

This example scheme provides a terse convention in order to communicate the information to devices with smaller displays or via wireless auditory devices where a computer generated voice could periodically report subordinate status as follows: "Jones..LL....Mathis..L--....Leonard LH".

The superior may monitor the display to evaluate the workload of the subordinates. As seen in the screen shots 300, 310, 320 and described with respect to Table 1, the workload data is presented in an easily understood manner. As a result, the superior can quickly identify suboptimal user states, both over-utilized and under-utilized states. The superior may make task adjustments after reviewing the data to achieve a more balanced workload distribution.

Figure 4:
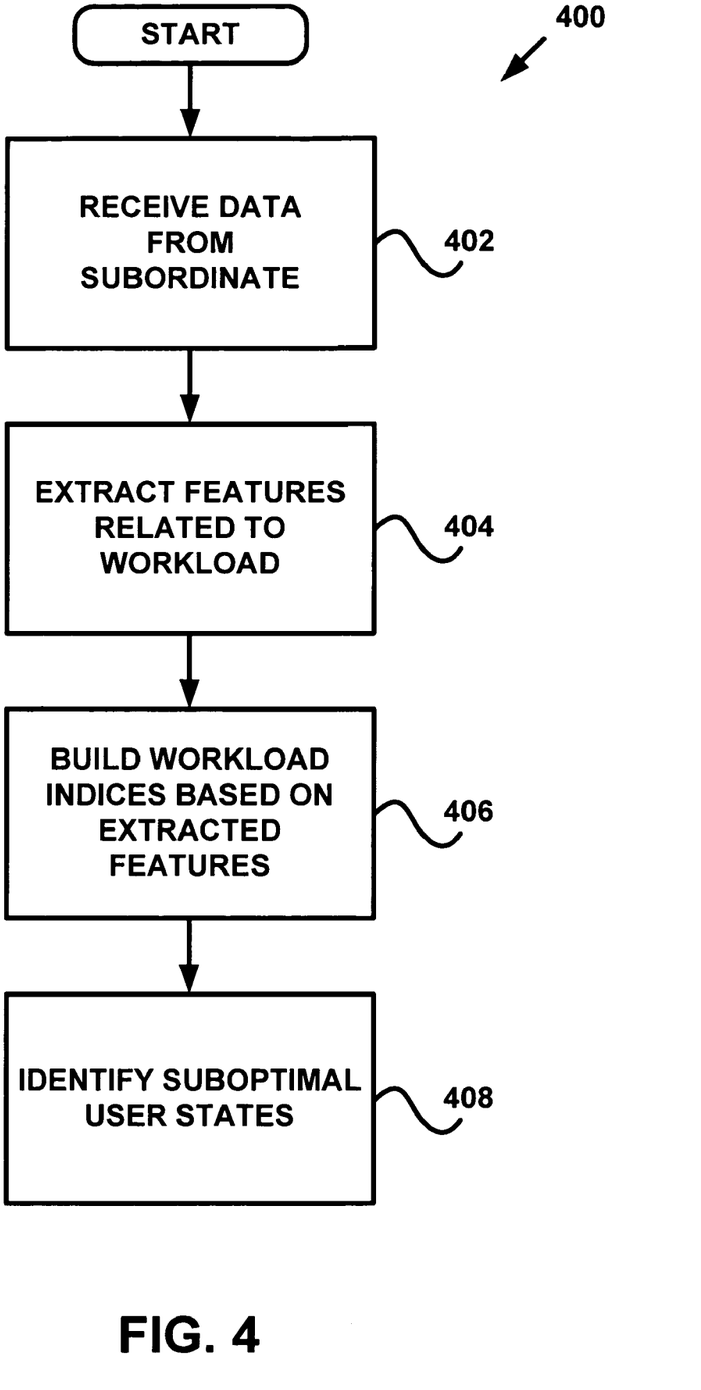
FIG. 4 is a flow diagram of a method for monitoring the workload of the group of subordinates depicted in FIG. 1, according to an example.

FIG. 4 is a flow diagram 400 of a method for monitoring the workload of the group of subordinates 102 depicted in FIG. 1. At block 402, data are received. The data may be received from one or more devices located on a subordinate. Data may be received from more than one subordinate in the group of subordinates 102. Preferably, data are received from all subordinates in the group of subordinates 102, but there may be situations in which a representative sample may be sufficient or in which it is only necessary to monitor a key subordinate.

At block 404, features related to workload are extracted. The selection of what data to use for analyzing workload may be determined prior to receiving the data and may be based on various factors, such as the type of sensors being used and the activity being performed by the subordinates. Once the features are extracted, at block 406, workload indices based on the extracted features are built. This may include normalizing the extracted features.

At block 408, suboptimal user states are identified. By comparing the workload indices with historical data, the current user state may be evaluated. The current user state may be presented in a variety of different visual display formats, as well as being provided as an auditory or tactile alert. The current user state may be suboptimal because the subordinate's workload is too light or too heavy. After identifying suboptimal user states, the superior may make task adjustments to achieve a more balanced workload distribution within the group of subordinates.

It should be understood that the illustrated embodiments are examples only and should not be taken as limiting the scope of the present invention. For example, several display formats for presenting workload information to a superior were described herein. However, the invention is not limited to any particular display format. The claims should not be read as limited to the described order or elements unless stated to that effect. Therefore, all embodiments that come within the scope and spirit of the following claims and equivalents thereto are claimed as the invention.

We claim:

1. A method for analyzing subordinate workload, comprising in combination:

receiving data from at least one sensor that detects at least one physiological characteristic, at least one contextual characteristic, and at least one cognitive state of an individual;
selecting data that are relevant to a workload level of the individual;
normalizing the selected data to build workload indices;
comparing the workload indices with historical data to evaluate a current workload state of the individual; and
displaying the current workload state of the individual.

2. The method of claim 1, wherein the at least one sensor is selected from the group consisting of one or more of an electroencephalogram (EEG) sensor, an electrocardiogram (ECG) sensor, an electro-oculogram (EOG) sensor, an impedance pneumogram (ZPG) sensor, a galvanic skin response (GSR) sensor, a blood volume pulse (BVP) sensor, a pupilometry sensor, visual scanning sensor, blood oxygenation sensor, a respiration sensor, an electromyogram (EMG), a blood pressure sensor, a skin and core body temperature sensor, a near-infrared optical brain imaging sensor, an accelerometer, an acoustic sensor, a global positioning system (GPS), and a gyroscope.

3. The method of claim 1, wherein the at least one sensor is located on at least one of the individual's body, clothing, and gear.

4. The method of claim 1, wherein the at least one sensor is located near the individual.

5. The method of claim 1, wherein selecting the data includes identifying what data are relevant to the workload level prior to receiving the data.

6. The method of claim 1, wherein presenting the normalized data includes presenting the normalized data in relationship to a historical data distribution.

7. The method of claim 6, wherein the normalized data are presented as a z-score that is normalized to the historical data distribution.

8. The method of claim 1, wherein displaying the normalized data includes displaying at least a portion of the normalized data on a coincident factor display.

9. The method of claim 1, wherein presenting the normalized data includes presenting a normalized historical trend chaff.

10. The method of claim 1, further comprising adjusting the workload level of the individual if the workload level is not within a predetermined range.

11. A system for analyzing subordinate workload, comprising in combination:

a processor;
data storage; and
machine language instructions stored in the data storage executable by the processor to:
receive data from at least one sensor that detects at least one physiological characteristic, at least one contextual characteristic, and at least one cognitive state of an individual;
extract features from the data that are relevant to a workload level of the individual;
normalize the data of the extracted features to build workload indices;
compare the workload indices to expected workload levels; and
identify whether the workload level is within a predetermined range.

12. The system of claim 11, wherein extracting features that are relevant to the workload level includes selecting what data to use to build the workload indices.

13. The system of claim 11, wherein building the workload indices includes normalizing the extracted features.

14. The system of claim 11, further comprising machine language instructions stored in the data storage executable by the processor to display the workload level.

15. A system for analyzing subordinate workload, comprising in combination:
   data logging means operable to receive, store, and index data representative of at least one physical characteristic, at least one contextual characteristic, and at least one cognitive state of an individual;
   distribution means operable to select data from the indexed data relevant to a workload level of an individual and normalize the selected data;
   statistical process control means operable to calculate a mean and standard deviation associated with the normalized data; and
   display means operable to present the normalized data in a context to evaluate the workload level of the individual.

16. The system of claim 14, wherein the display means presents the normalized data in relationship to a historical data distribution.

17. The system of claim 14, wherein the display means presents the normalized data on a coincident factor display.

18. The system of claim 14, wherein the display means presents the normalized data in a normalized history view.

* * * * *

UNITED STATES PATENT AND TRADEMARK OFFICE
CERTIFICATE OF CORRECTION

| | |
|---|---|
| PATENT NO. | : 7,454,313 B2 |
| APPLICATION NO. | : 11/442894 |
| DATED | : November 18, 2008 |
| INVENTOR(S) | : Stephen D. Whitlow et al. |

It is certified that error appears in the above-identified patent and that said Letters Patent is hereby corrected as shown below:

Column 10, line 42, "chaff" should be changed to --chart--.

Signed and Sealed this

Tenth Day of February, 2009

JOHN DOLL
*Acting Director of the United States Patent and Trademark Office*